United States Patent
Sutherland et al.

(10) Patent No.: US 10,592,493 B1
(45) Date of Patent: Mar. 17, 2020

(54) SPOT-INSTANCED BULK DATA UPLOADING

(71) Applicant: Amazon Technologies, Inc., Seattle, WA (US)

(72) Inventors: Ammon Sutherland, Mckinney, TX (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 560 days.

(21) Appl. No.: 15/194,214

(22) Filed: Jun. 27, 2016

(51) Int. Cl.
*G06F 16/23* (2019.01)
*G06F 16/25* (2019.01)

(52) U.S. Cl.
CPC ...... *G06F 16/2343* (2019.01); *G06F 16/2386* (2019.01); *G06F 16/258* (2019.01)

(58) Field of Classification Search
None
See application file for complete search history.

(56) References Cited

U.S. PATENT DOCUMENTS

| 2009/0210631 | A1* | 8/2009 | Bosworth | G06F 12/0875 711/141 |
| 2015/0379096 | A1* | 12/2015 | Flynn | G06F 16/211 707/602 |
| 2016/0070819 | A1* | 3/2016 | Soderberg | G06F 16/27 707/694 |
| 2017/0286456 | A1* | 10/2017 | Wenzel | G06F 16/212 |
| 2018/0152514 | A1* | 5/2018 | Hakansson | G06F 16/258 |

* cited by examiner

*Primary Examiner* — Wilson Lee
(74) *Attorney, Agent, or Firm* — Davis Wright Tremaine LLP

(57) ABSTRACT

A database engine may maintain a collection of data on a first storage device. A workflow manager node may receive a request to bulk load data into the collection. The workflow manager may instruct a control plane node to allocate and configure a secondary database node and to make operable thereon a second database using a second storage device. Data may be bulk loaded to the second storage device using a schema and storage unit format compatible with the collection of data. Storage units from the second storage device may be transferred to the first storage device and integrated into the collection of data.

20 Claims, 8 Drawing Sheets

SPOT-INSTANCED BULK DATA UPLOADING

BACKGROUND

Database management systems may typically accrue data through insert operations. Typically, each insert operation adds a relatively small number of rows or items to the collections of data maintained by the system. In some cases, however, large amounts of data are added in a single operation. Operations such as this are sometimes referred to as bulk load or bulk insert operations. They may be performed, for example, when transferring data between two databases, or when re-adding data that had been previous archived and removed. Large amounts of data may be involved. As such, bulk load operations may be lengthy and may have the potential to adversely impact the operation of a database management system.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
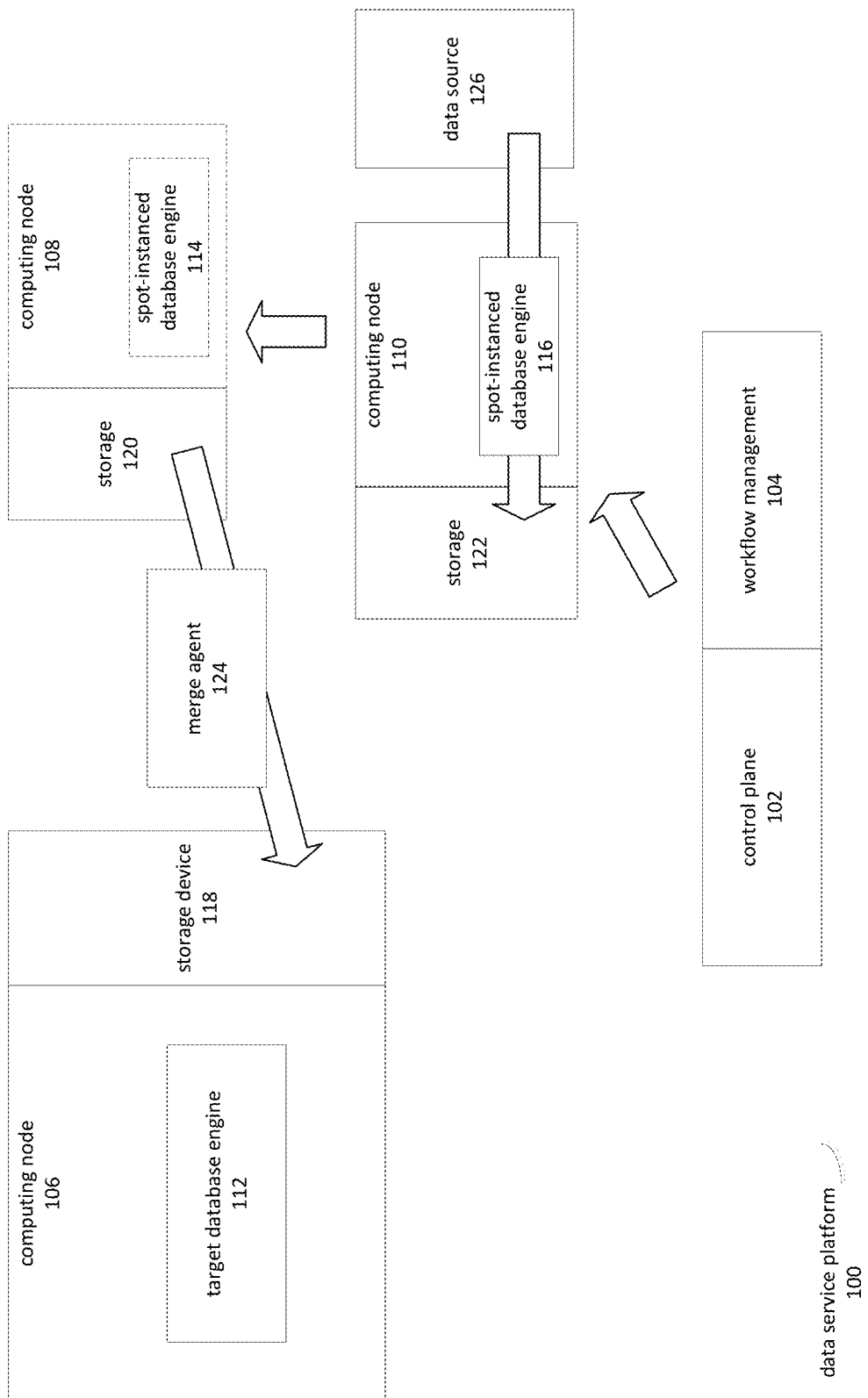
FIG. 1 is a block diagram depicting a data service platform.

Disclosed herein are systems, methods, and computer program products pertaining to bulk loading data into a database management system. In particular, the disclosed systems, methods, and computer program products pertain to bulk loading data into a data service hosted by a provider of such services. A bulk load service may be provided in which data is first loaded into a dynamically instanced database instance that is configured to use a storage format compatible with the target database engine and collection of data. The loaded data may then be added to the target database by copying the underlying storage units from the spot-instanced database to the target database, and then updating catalog information of the target database to refer to the new storage units. This approach may shorten the time required for bulk loading data, while also reducing the impact of bulk loading data on other services provided by the target database. In some instances, multiple database instances may be formed, further reduce bulk load times.

In an example, a workflow manager and control plane of the database service may receive a request to add data from a data source to a first collection of data maintained by a target database engine. The target database engine may initially maintain the first collection in one or more storage units stored on a first storage device. The workflow manager and control plane may then configure a second database engine on a dynamically allocated (i.e. "spot-instanced") computing node. The spot-instanced computing node and second database engine may be configured based in part on the characteristics and parameters of the requested bulk load operation. The second database engine, for example, may be configured to operate in a reduced locking mode which is based on the assumption that the database engine will have a single user that performs only the requested bulk load operation.

The workflow manager and control plane may configure the second database engine to store bulk-loaded data from the data source in a second collection of data that is compatible with the first collection. The second collection of data may conform to at least a subset of the first collection's schema. The second database engine may, moreover, be configured to store data for the second collection using a storage format compatible with the first collection.

The workflow manager and control plane may instruct the second database engine to load data from the bulk-load data source into the second collection, using the selected schema and storage unit format. After data has been loaded into the second collection, data for the second collection may be transferred by the workflow manager to a storage device used by the first database engine, and on which the first database engine maintains the first collection.

The workflow manager may then configure the first database engine to maintain a modified version of the first collection of data, in which the modified first collection comprises both the original storage units of the first collection and the storage units copied from the storage device used by spot-instanced database.

In some cases, data may be loaded by spot-instancing a number of computing nodes, configuring the nodes as databases dedicated to bulk loading specific subsets of data, transferring the subsets to a target database, and incorporating the data files into the target database. In an example, data for a number of tables may be bulk-loaded using at least one spot-instanced computing node for each table. In another example, bulk loading a partitioned table may involve using a spot-instanced node for each partition of the table.

FIG. 1 is a block diagram depicting a data service platform 100. The data service platform 100 may comprise a computing node 106 on which a database engine 112 is operative. The database instance 112 may maintain a collection of data on a storage device 118 that is in communication with the computing node 106. Various clients (not shown) may issue requests to access the collection of data. The database engine 112 may process these requests by reading from or writing to the storage device 118.

The database engine 112 may maintain the collection of data on the storage device 118 in discrete units which may be referred to herein as storage units. A storage unit may correspond to a file, to a region or block within a file, or to some other unit or division of data. The database engine 112 may maintain information, such as a catalog or metadata table, which comprises references to the storage units that make up a collection of data. For example, if a collection of table were made up of five files maintained on the storage device 118, the database engine might refer to such a catalog when it needs to locate and access one of the files. In some instances there may also be metadata which refers to intra-file storage units. For example, a data file might comprise ten different subdivisions, which may be referred to as blocks. Metadata might indicate which of those blocks is in use, and which are free.

A client of the data service platform 100 might wish to bulk load data into the collection of data maintained by the database engine 112. A bulk load operation may comprise obtaining data from a data source 126 and loading it into the collection of data maintained by the database engine 112. The operations may comprise storing data in the various storage units maintained by the database engine 112. However, directly loading the data from the data source 126 to the storage device 118 may reduce the operating efficiency of the database engine 118 while the bulk load is in progress.

The data service platform 100 may comprise a control plane 102 and a workflow management component 104. The workflow management component 104 may coordinate operations related to the bulk loading of data. In order to reduce disruptions to the operating efficiency of the database engine 118 while the bulk load is in progress, the workflow management component 104 may utilize an additional computing node to load data into storage units compatible with those used by the database engine 118. These storage units, containing the bulk-loaded data, may be copied to the storage device 118 and then integrated into the catalog of the database engine 112, so that the database engine 112 utilizes both the original storage units and the copied storage units when processing queries involving the collection of data.

The workflow management component 104 may execute a workflow to form additional computing nodes 108, 110 to perform bulk load operations. The workflow may instruct a control plane 102 to form the additional computing nodes 108, 110. The control plane 102 may perform operations such as allocating resource slots, copying computing node images, configuring computing nodes, configuring network communications, and so on.

The control plane 102 may, for example, configure a computing node 110 to be in communication with a storage device 122. This may, in some instances, comprise establishing network connectivity between the computing node 110 and the storage device 122. In others, it may comprise configuring the computing node 110 to access a storage device to which the computing node 110, or a host of computing node 110, is communicatively coupled. For example, the storage device 122 might, in this instance, be a solid-state storage device physically connected to a host device of the computing node 110.

The control plane 102 may also cause the computing node 110 to be configured to operate a database engine 116. The configuration may include causing the database engine 116 to maintain a new collection of data, to be populated by the bulk load, on the storage device 122.

The computing node 110 and database engine 116 may be configured in view of being used primarily for bulk load operations. For example, regarding the computing node 116, the number of processors assigned to the computing node 116 might depend on characteristics of the data source. In some instances, the number of processors might increase in proportion to the number of collections of data to be loaded from the data source 126, since each collection might be loaded independently. Similarly, a lesser number of processors might be allocated to the computing node 116 based on a configuration of the database engine 116 in which threads of execution not related to loading and storing the data are suspended. Moreover, the database engine 116 might also be configured to bypass synchronization mechanisms, such as locking, that would normally be employed when a database engine (such as the target database engine 112) is active in a multiuser environment.

The storage device 122 may also be configured in view of being used primarily for bulk load operations. For example, storage devices optimized for write operations might be selected. The write optimizations may include those directed to serially ordered writes, such as might be used to store a sequentially-written clustered index. In some instances, additional storage devices may be allocated based on the number of independent collections of data that are to be loaded.

Once the computing node 110 is configured, it may be instructed by the workflow management module 104 to initiate a bulk load of data from the data source 126 into a collection of data stored on the storage device 122. The collection of data may be consistent with the schema of the collection of data maintained by the target database engine 112. This collection of data, comprising the bulk-loaded data, may be stored on the storage device 122 in one or more storage units that are compatible with those of the storage units that make up the target collection of data maintained by the target database engine 112.

Once the data from the data source 126 has been stored on the storage device, the database engine 116 may become quiescent. In some cases, the computing node 110 on which the database engine 116 operated may also become quiescent. In some embodiments, computing node instances may be pooled and reallocated to other bulk load operations. When this is the case, the computing instance may be deallocated and returned to a pool of computing node instances that may be used for other bulk load operations. The storage device used by the computing node, however, could be retained at least until the storage units containing the bulk load data are transferred to the target storage device 118. When computing nodes or storage devices are reallocated, various operations may be performed on the nodes prior to their reuse, such as wiping the contents of the storage devices and the memory of the computing nodes.

In FIG. 1, a second computing node 108 and associated database engine 114 may be in a quiescent state after performing a bulk load operation. The second computing node 108 and database engine 114 may have been deallocated and may no longer be in use.

The storage units containing the bulk loaded data may be copied from the storage device 120 to the target computing node 106. This process may be facilitated by a reader-writer process, referred to as a merge agent 124 in FIG. 1, which reads data from the spot-instanced storage device 120 and transfers it to the target storage device 118. The merge agent 124 may then, after the copy is complete, modify the configuration of the target database engine 112 to process queries of the first collection using not only the original storage units maintained on the target storage device 118, but also the new storage units that contain the bulk loaded data.

Figure 2:
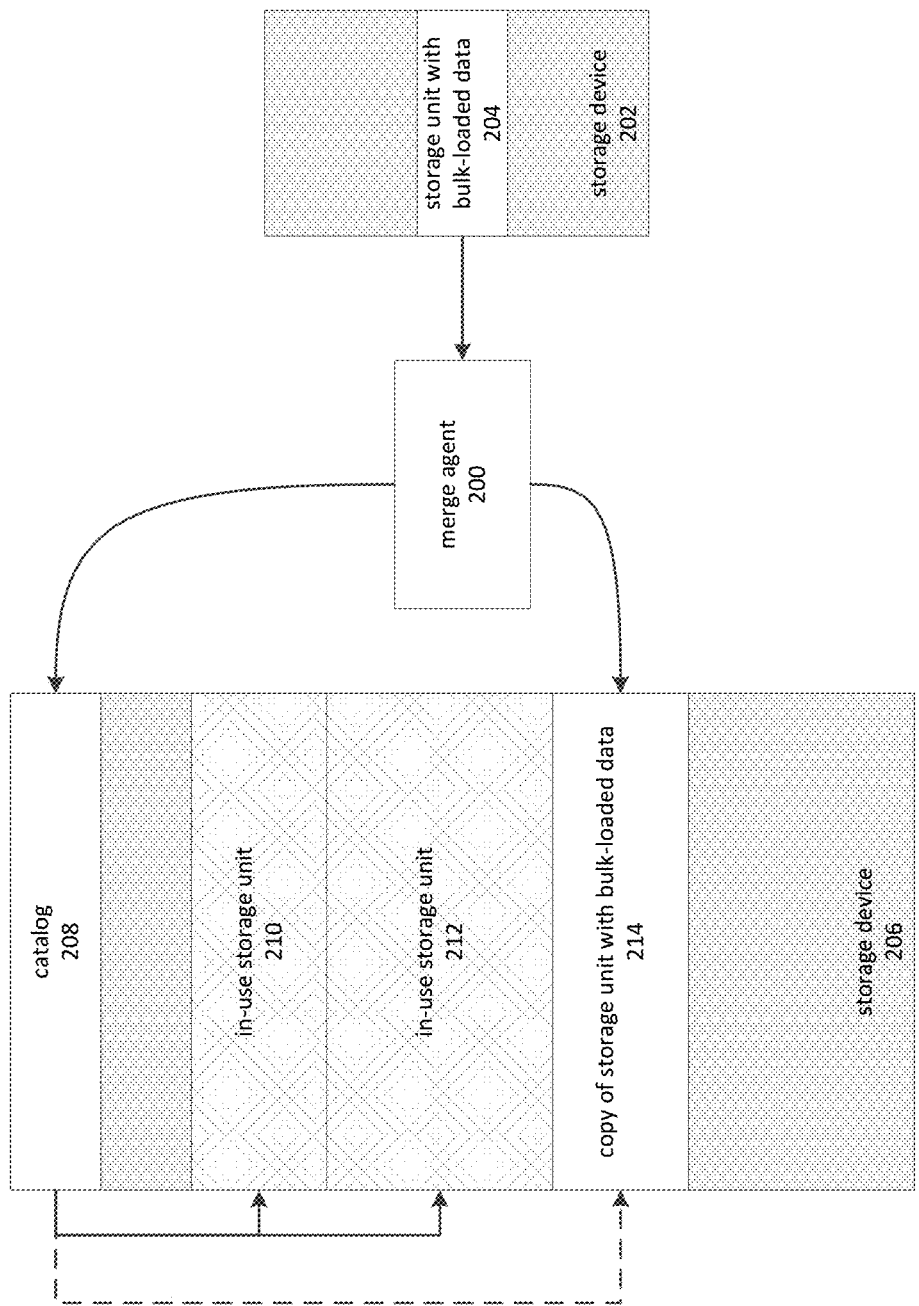
FIG. 2 is a block diagram depicting merging storage units into a collection of data.

FIG. 2 is a block diagram depicting merging storage units into a collection of data. A storage unit 204 containing bulk-loaded data may be stored on a spot-instanced storage device 202. The spot-instanced storage device 202 may have been associated with a spot-instanced computing node, such as the computing nodes 108, 110 depicted in FIG. 1.

The storage device 206 of a target database engine, such as the target database engine 112 depicted in FIG. 1, may store a catalog 208 and a number of storage units 210, 212 that are used in a collection of data. The catalog 208 may comprise references to the storage units 210, 212. The references may associate the storage units 210, 212 with the collection of data maintained by the target database engine.

The merge agent 200 may combine the bulk-loaded data into the collection of data by copying the storage unit 204 that contains the bulk-loaded data from the spot-instanced storage device 202 to the target storage device 206, and then integrating the copied storage unit 214 into the collection of data. The merge agent 200 may do so by modifying the catalog 208 to refer to the storage unit 214 containing the bulk loaded data, while leaving other references, e.g. to the other storage units 210, 212, in place.

The target database engine may remain active during the stage in which the storage unit 204 is copied from the spot-instanced storage device 202 to the target storage device 206. During the subsequent stage, the target database engine may be locked while the catalog is updated to refer to the copy of the storage unit 214 that contains a copy of the bulk loaded data.

Figure 3:
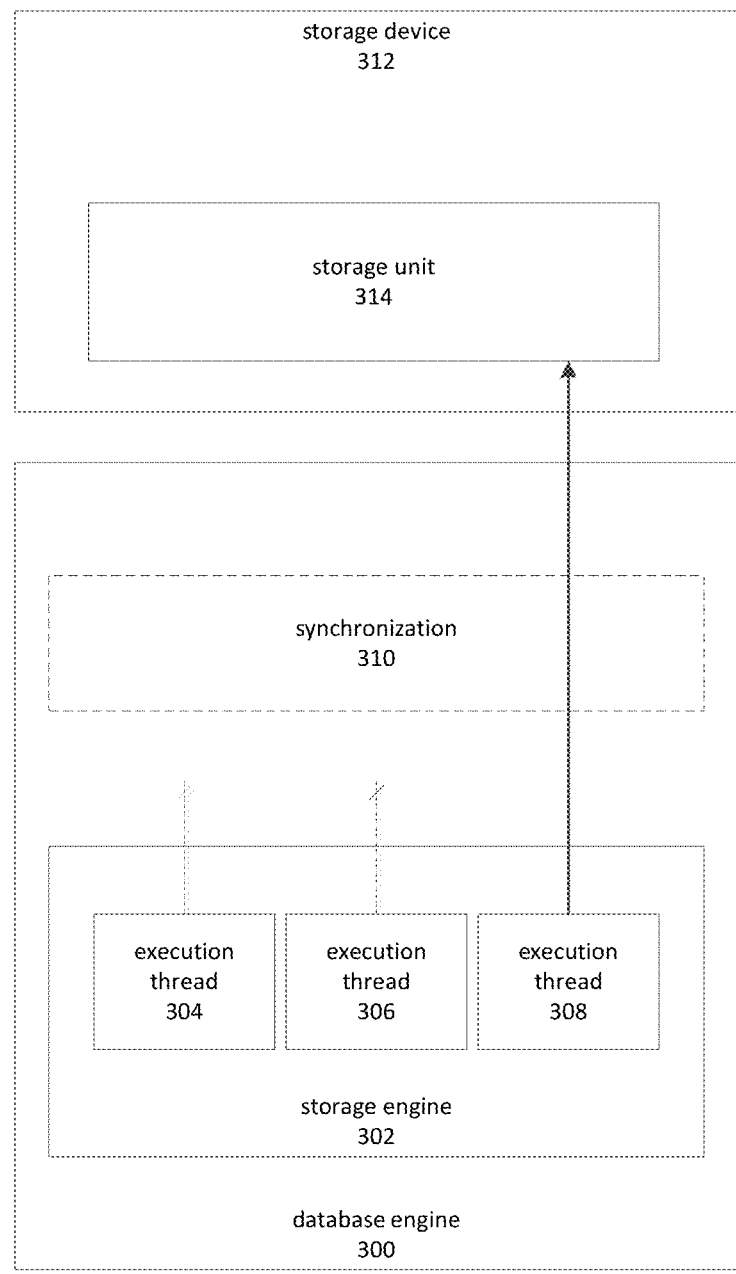
FIG. 3 is a block diagram depicting operation of a spot-instanced database during a bulk-load operation.

FIG. 3 is a block diagram depicting operation of a spot-instanced database during a bulk-load operation. A spot-instanced database engine 300 may be configured for performing bulk load operations. The database engine 300 may also be configured so that the ability to perform certain operations, such as those unrelated to bulk-loading, are disabled. Moreover, aspects of the database engine 300 that are not used for bulk loading data may be disabled in order to improve bulk load efficiency.

The database engine 300 may comprise a storage engine 302. The storage engine may interface with a spot-instanced storage device 312 to store bulk loaded data. Typically, the storage engine may comprise functions related to reading and updating data. In some instances, these functions may be disabled due to the spot-instanced database engine 300 being dedicated to bulk loading.

The storage engine 302 may comprise threads of execution 304-308. The threads of execution 304-308, might each perform read and write operations for a given database query. In order to prevent the threads of execution from interfering with each other, for example by generating conflicting write operations, the database engine 300 may comprise a synchronization element 310. For example, the database engine 300 might perform table-level, block-level, or row-level locking on data maintained in the collection. Typically, access to an item in the collection of data is blocked for other threads 306, 308 when a first thread 304 is accessing the item. This may, in some instances, reduce the efficiency of the database engine 300. However, because the database engine 300 is configured specifically for bulk-load, the synchronization element 310 may be disabled or minimized. For example, during a bulk load operation typical access patterns may include operations being limited to inserts (as opposed to updated and deletes). Read operations may in some instances be performed, but it may not be necessary to apply locks when reading, since during a bulk load rows that have already been read are unlikely to be modified again while the bulk load is in progress. The database engine 300 may also be configured so that certain threads of execution 304, 306 are disabled. The threads 304, 306 that are disabled may be identified based on those threads being unrelated or unassociated with bulk load operations.

Figure 4:
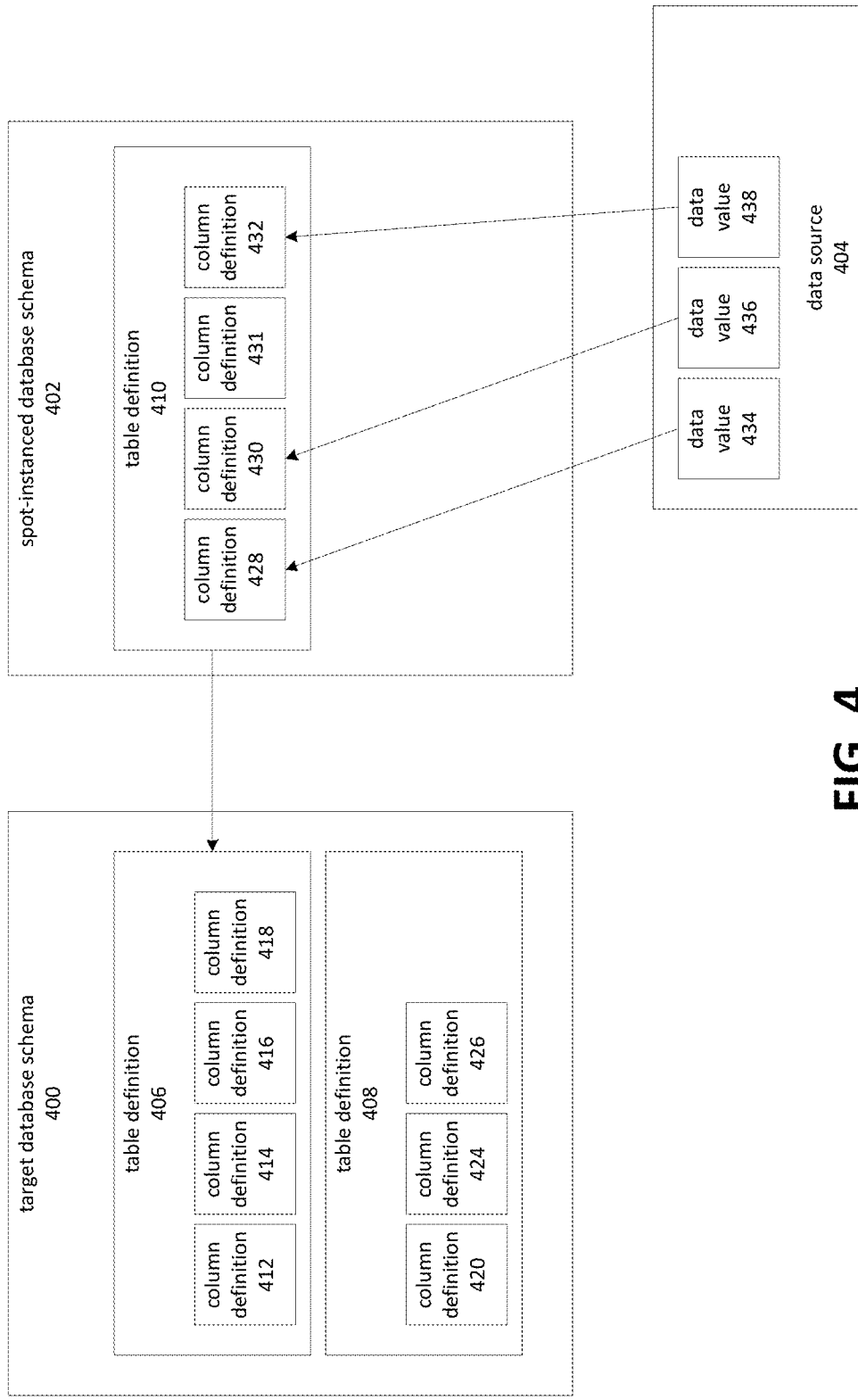
FIG. 4 is a block diagram depicting corresponding schemas.

FIG. 4 is a block diagram depicting corresponding schemas. A target schema 400 may correspond to a collection of data maintained by a database engine such as the target database engine 112 depicted in FIG. 1. The schema may refer to the organization of a collection of data. A collection of data might, for example, have an organization based on tables, although numerous other organizational structures are possible. Typically, tables consist of rows organized by columns. In the example of FIG. 4, the target schema 400 comprises two table definitions 406, 408. One of the table definitions 406 contains for column definitions 412-418, and the second contains three column definitions 420-426. The depicted arrangement of tables and columns is intended to be illustrative of general principles related to correspondence between schemas, and should not be viewed as limiting.

The schema 402 of a spot-instanced database may correspond to that of the target database schema 400. In some instances, the schema 402 of the spot-instanced database will correspond as a subset of the schema 400 of the target database. In the example of FIG. 4, the schema 402 of the spot-instanced database includes one table 410 which corresponds to a table 406 in the target database schema 400. Although the table definition 406 associated with the target schema 400 has four columns 412-418, the corresponding table definition 410 contains three columns 428-432, mapping to columns 412, 414, and 418 of the table definition 406 of the target schema 400.

The schema 402 of the spot-instanced database (or more precisely, that of the collection of data maintained by the spot-instanced database) may be determined based on the data source 404 and on that of the target database schema 400. In general, the schema 402 of the spot-instanced database may be based on a mapping between the data available from the data source 404 and the schema 400 of the target database. For example, the data source 404 might provide data for three values 434-438 per item of data. These values 434-438 might be mapped to columns 412, 414, and 418 of the table definition 406 of the target schema 400. Based on this mapping, the definition of table 410 in the schema 402 of the spot-instanced database might include corresponding columns 428-432. Moreover, it might be the case that the data source 404 does not provide any data related to the second table definition 408 of the schema of the target database 400. As such, it may be excluded from the schema 402 of the spot-instanced database.

The schema of the target database may be copied in its entirety to the spot instance. In some instances, the data source 404 might not contain all of the columns defined in the table definition 406 of the schema 400 of the target database. For example, in FIG. 4, the data source 404 may provide three data points per row, depicted as data values 434-438. These may map to columns definitions 428, 430, 432 in the table definition 410. However, as depicted in FIG. 4, a column definition 431 may be included in the table definition 410 even if it is not available from the data source 404. In such cases, the column definition 431 may be left in the table definition 410 so that it matches the table definition 406 in the target schema 400. This approach may allow the underlying data structures and other elements in the spot-instanced database to match those of the target database. The elements of the schema used by the spot-instanced database may be selected so that the storage units used on the spot-instanced database match those used by the target database.

Figure 5:
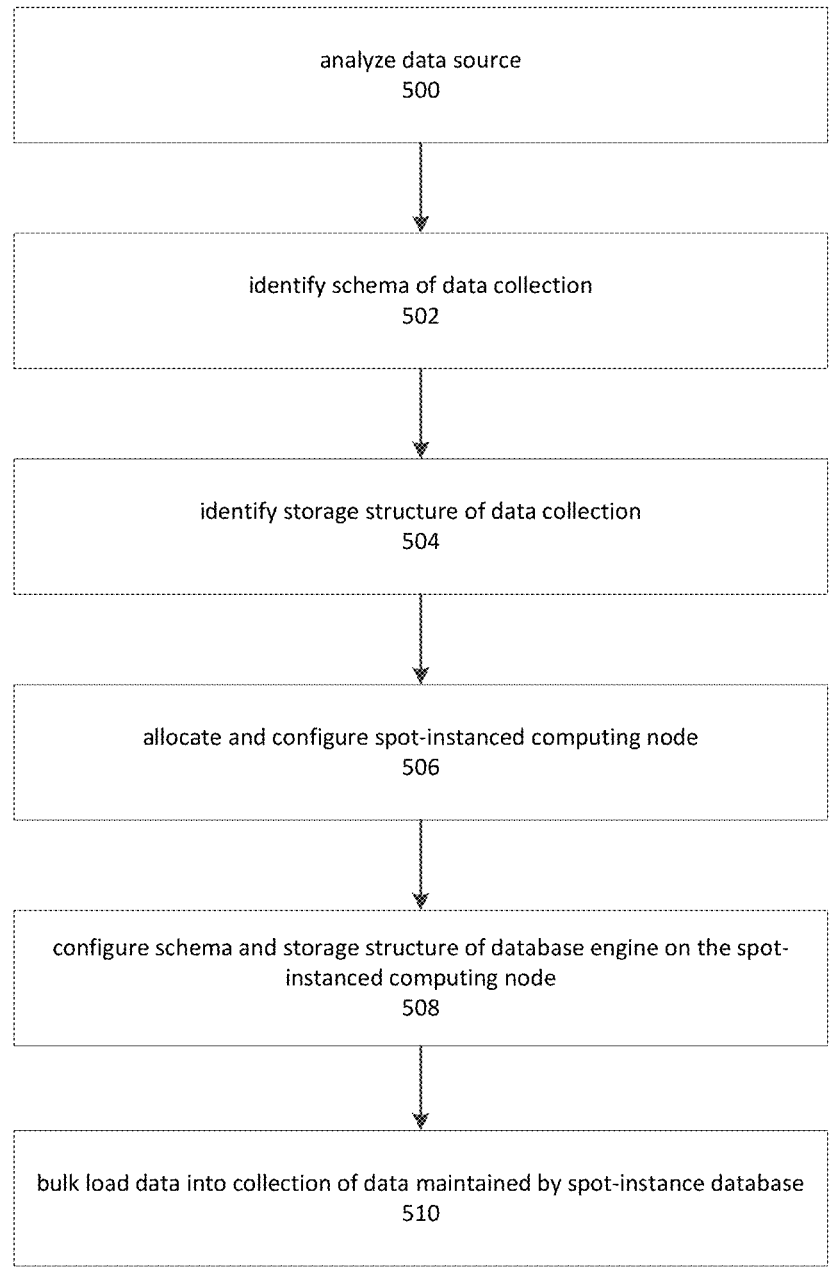
FIG. 5 is a flow diagram depicting an example of bulk loading data into a spot-instanced database.

FIG. 5 is a flow diagram depicting an example of bulk loading data into a spot-instanced database. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Embodiments of the depicted process may be implemented using various combinations of computer-executable instructions executed by a computing system, such as the computing systems described herein.

Bulk loading data into a spot-instanced database, as an initial stage of bulk loading data into a target database, may involve analyzing the data source, as depicted by block 500. The analysis may typically be performed by a workflow management module that initiates and coordinates the bulk load process depicted by FIG. 5. The data source may comprise various elements in the alternative or in combination, such as flat files, database queries, executable programs, metadata, and so on. The analysis stage of block 500 may comprise determining what data is to be loaded, from the data source as well as any additional information supplied by the entity that initiated the bulk load. The output of the analysis stage may comprise information identifying the organization of the data to be loaded by the bulk load process. Thus, the operations of block 500 are related to those of block 502, in which the schema of the target data collection is identified. The data available from the data source may be mapped, for example, to the tables and columns of a collection of data stored in relational format, or to key-value pairs of a collection of data maintained as a key-value store.

At block 504, the storage structure of the data collection may be identified. The workflow management module may obtain information describing the structure of the storage units that comprise the target collection of data. Based on this information, the workflow management module may cause the spot-instanced database to use a storage unit structure selected for its compatibility with the target collection of data. For example, if the target collection uses files as a storage unit, the spot-instanced database may be constructed similarly. This stage may be informed by additional information provided by the entity initiating the bulk loading process. For example, information concerning patterns or conventions to which the storage units conform may be provided when the bulk load is initiated.

At block 506, a computing node may be allocated and configured to execute a database engine. The allocated and configured computing node and database engine may be referred to as a spot-instanced computing node and database engine. As described herein, the configuration of the computing node and the database engine may be based in part on factors such as the amount of data to be transferred, the expected performance characteristics of the process, and so on. As depicted by block 508, the schema and storage structure of the spot-instanced database may be configured to be compatible with that of the target database. This may involve selecting, for the spot-instance database, a format for storing the bulk loaded data based on compatibility between the format of storage units used to contain the bulk loaded data and the format of the storage units used by the target database. The configuration of the computing node may also involve configuring the computing node to be in communication with a suitable storage device, and configuring the spot-instanced database engine to employ it to maintain the temporary collection of data.

Next, at block 510, the data from the data source may be loaded by the spot instanced database into the collection of data maintained by the spot instanced database. In other words, the spot-instanced database engine may receive data from the data source and store it in the temporary collection of data.

Figure 6:
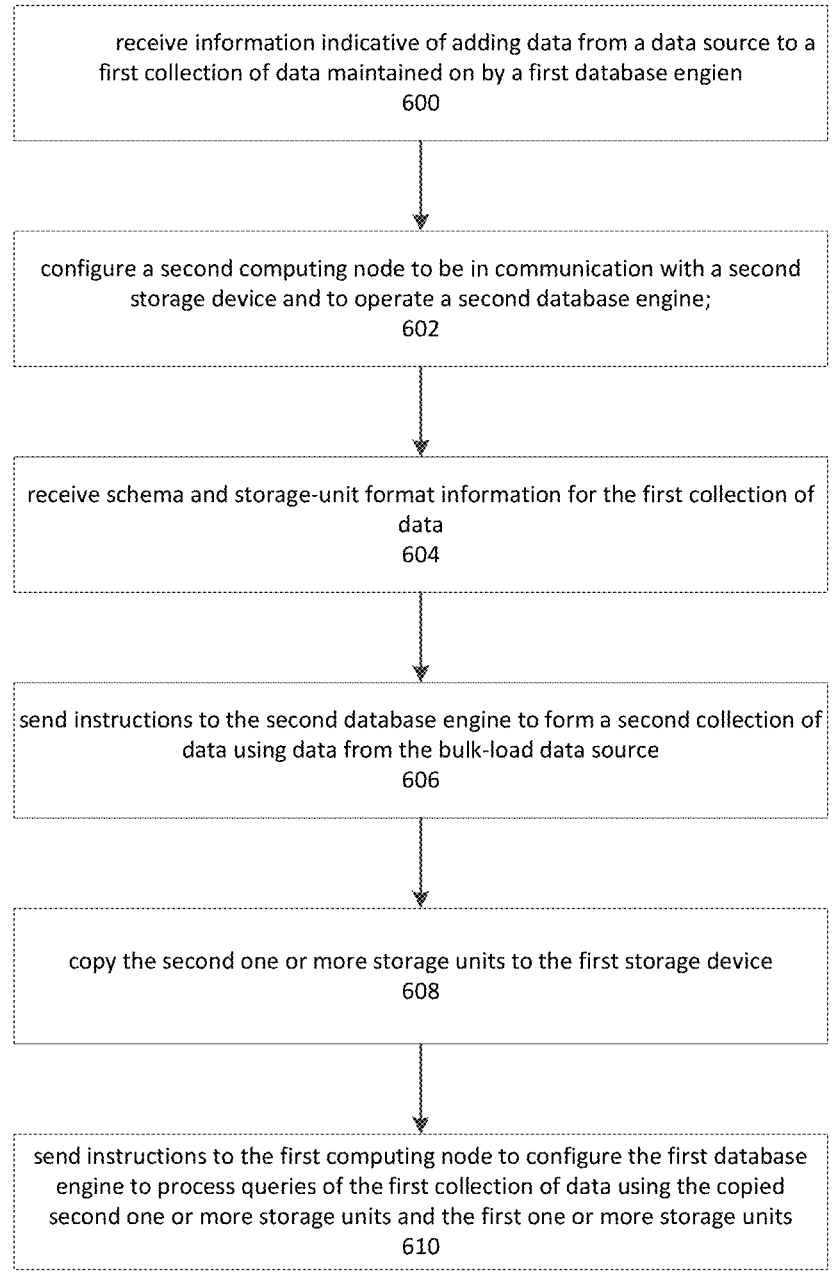
FIG. 6 is a flow diagram depicting an example of a bulk load process using a spot-instanced database.

FIG. 6 is a flow diagram depicting an example of a bulk load process using a spot-instanced database. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions.

In the example of FIG. 6, a system may comprise a first computing node that is in communication with a first storage device. A first database engine may be operative on the first computing node, and may maintain a first collection of data on the first storage device.

One or more computing nodes may perform operations related to completion of a bulk load request. The one or more computing nodes may comprise control plane and workflow manager nodes. The control plane may allocate and configure computing nodes as instructed by the workflow manager. The workflow manager may coordinate execution of a workflow for loading data from the data source into the second collection of data, copying the second one or more storage units, and configuring the first database engine The computing nodes may, as depicted by block 600, receive information indicative of adding data from a data source to the first collection of data. This may involve receiving a request to initiate a bulk load operation. The request may comprise information about the data source, which subsets of the data source are to be loaded, the structure of the target collection of data and the format of its storage units, and so forth.

As depicted by block 602, the computing nodes may configure a second computing node to be in communication with a second storage device on which the bulk loaded data may be temporarily stored. The capacity of the second storage device may be based on the amount of data that is to be loaded from the bulk load data source. The computing nodes may also configure the second computing node to operate a second database engine, and to maintain the bulk loaded data on the second storage device. The second computing node may be configured to prioritize operations related to adding data from the data source to the second collection of data.

In some instances, computing nodes may be selected for spot-instancing from a pool of available computing nodes. In some instances, the computing nodes in the pool may be pre-configured for bulk-load operations, consistent with the configurations for the spot-instanced computing node as described herein. The spot-instanced computing nodes may be deallocated and returned to the pool after the bulk load is completed. In some instances, this may occur after the data has been bulk loaded and stored on the second storage device. In other instances, the deallocation may occur after the data has been transferred from the storage device of the spot-instanced database engine to the storage device of the target database engine.

The bulk loaded data may be maintained on the second storage device in a temporary collection of data. As depicted by block 604, one the computing nodes, in some instances the workflow management module, may receive information indicative of a schema of the first collection of data. The workflow management module may also receive information indicative of the format of the storage units used by the first database engine to maintain the first collection of data on the first storage device.

The storage device on which the collection of data it to be maintained may be selected and/or configured based on its intended use as a temporary storage location. For example, the storage device may be write-optimized, and moreover may be optimized for sequential writes that might occur, for example, when bulk loading a clustered index. The storage device may also be selected based on expected characteristics of the transfer stage, in which storage units from the second storage device are copied to the first storage device associated with the target database engine. In some instances, the storage devices may be selected based on them being connected to the same physical device or network area storage, or in some cases being different partitions of the same storage device.

As depicted by block 606, the computing nodes may send instructions to the second database engine to form a second collection of data by bulk-loading data from the data source. The second database engine may form the second collection of data to be consistent with at least a subset of the schema of the first collection of data. In addition, the second database engine may store data in storage units that are in the same format as the storage units that comprise the first collection of data. The storage units for the temporary collection of data may be maintained on the second storage device.

In some instances, prior to performing the bulk load operation the second database engine may suspend execution threads that are unassociated with the bulk load operation. In other words, the database engine may operate in a dedicated bulk-load mode in which functions unassociated with adding data to the collection, from the bulk load data source, are ignored.

Block 608 depicts that the computing nodes may initiate a copy operation in which the storage units of the second, temporary collection of data are transferred to the first storage device. Then, as depicted by block 610, the computing nodes may send instructions to the first computing node to configure the first database engine so that queries of the first collection of data are processed using both the original set of storage units and the storage units copied from the second storage device. This may comprise modifying a configuration of the second database engine so that references to storage units of the first collection of data include references to the copied storage units, in addition to those storage units that initially made up the first collection of data.

Figure 7:
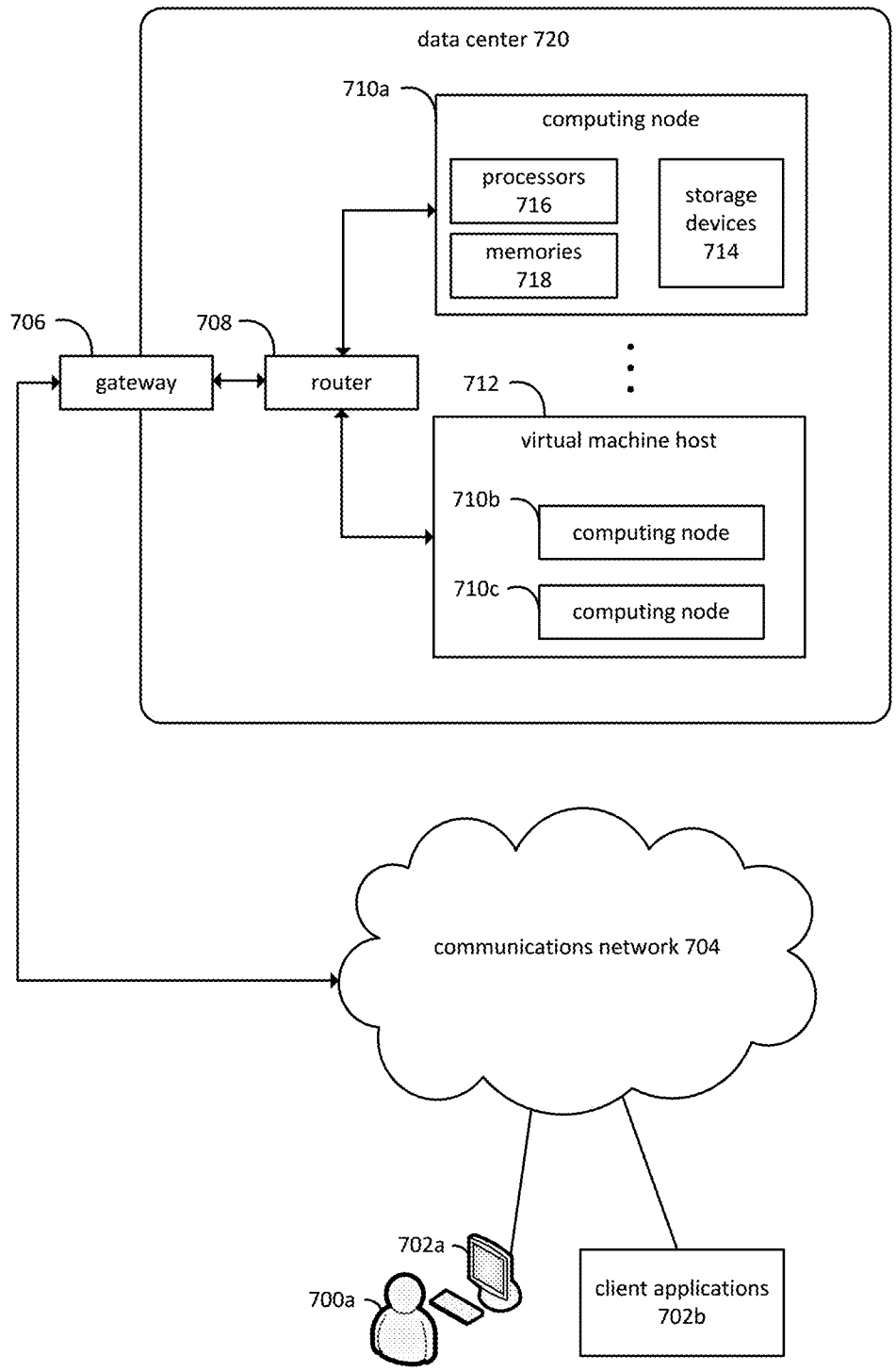
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 804 with processes executing on various computing nodes 710a, 710b, and 710c within a data center 720. Alternatively, client applications 702b may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 710a, 710b, and 710c, operating within data center 720, may be provided via gateway 706 and router 708. Numerous other network configurations may also be employed. Although not explicitly depicted in FIG. 7, various authentication mechanisms, web service layers, business objects, or other intermediate layers may be provided to mediate communication with the processes executing on computing nodes 710a, 710b, and 710c. Some of these intermediate layers may themselves comprise processes executing on one or more of the computing nodes. Computing nodes 710a, 710b, and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718, and one or more storage devices 714. Processes on computing node 710a may execute in conjunction with an operating system or alternatively may execute as a bare-metal process that directly interacts with physical resources, such as processors 716, memories 718, or storage devices 714.

Computing nodes 710b and 710c are depicted as operating on virtual machine host 712, which may provide shared access to various physical resources, such as physical processors, memory, and storage devices. Any number of virtualization mechanisms might be employed to host the computing nodes.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
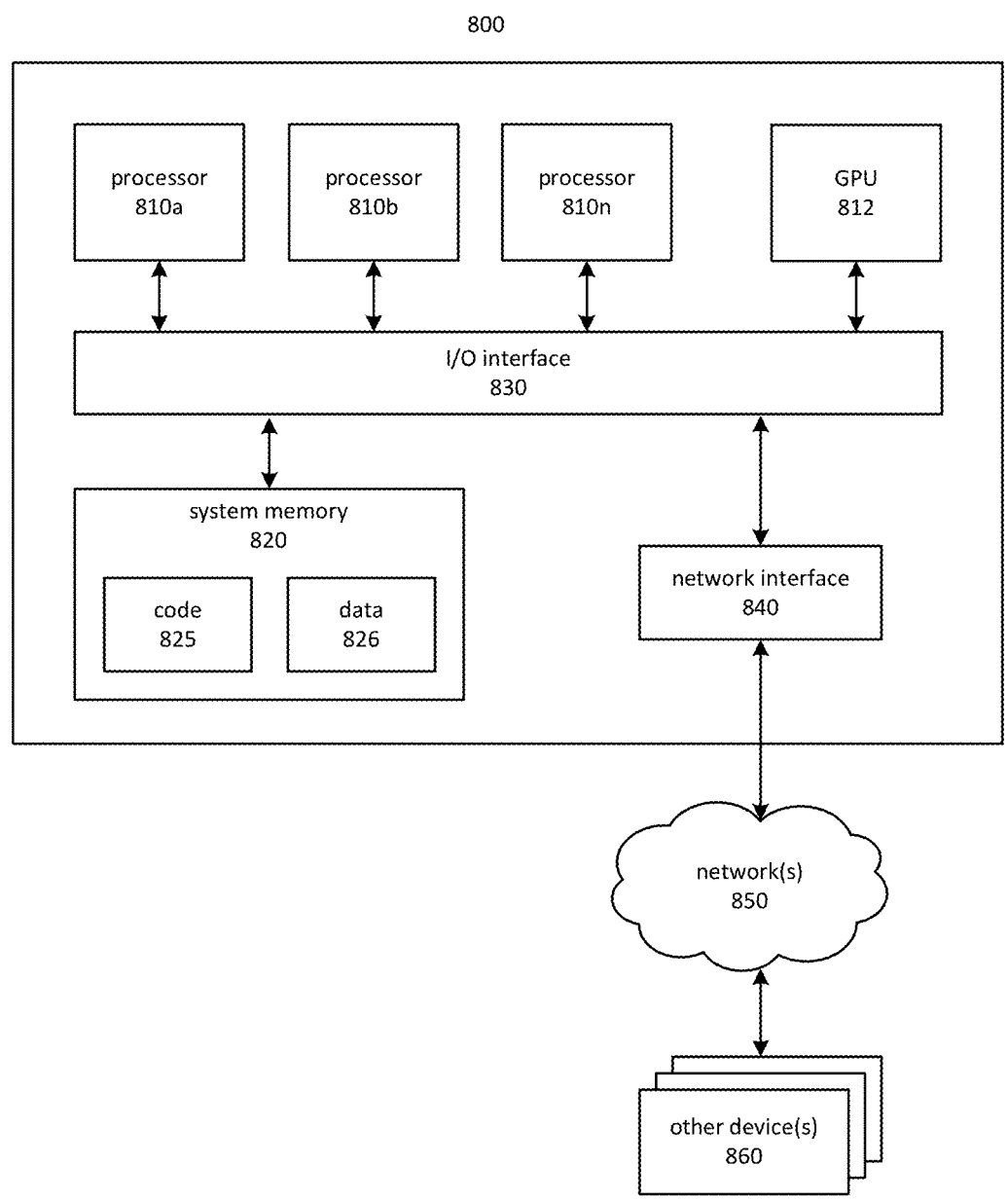
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810a, 810b, and/or 810n (which may be referred herein singularly as a processor 810 or in the plural as the processors 810) coupled to a system memory 820 via an input/output ("I/O") interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 910. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
a first computing device in communication with a first storage device, wherein a first database engine operative on the first computing device maintains a first collection of data on the first storage device; and
one or more computing devices that at least:
receive information indicative of adding data from a data source to the first collection of data;
configure a second computing device to be in communication with a second storage device and to operate a second database engine;
receive information indicative of a schema of the first collection of data and information indicative of a format of a first one or more storage units, wherein the first collection of data is stored in the first one or more storage units on the first storage device;
send instructions to the second database engine to form a second collection of data obtained from the data source, the second collection of data consistent with at least a subset of the schema of the first collection of data, the second collection of data stored in a second one or more storage units on the second storage device, the second one or more storage units in the format of the first one or more storage units;
copy the second one or more storage units to the first storage device; and
send instructions to the first computing device to configure the first database engine to process queries of the first collection of data using the copied second one or more storage units and the first one or more storage units.

2. The system of claim 1, wherein the second database engine is configured to prioritize operations related to adding data from the data source to the second collection of data.

3. The system of claim 1, wherein the second database engine at least:
suspends threads of execution of the second database engine that are unassociated with adding data from the data source to the second collection of data.

4. The system of claim 1, wherein the first computing device at least:
modifies a configuration of the second database engine, the configuration comprising references to storage units of the first collection of data, to comprise one or more references to the second one or more storage units in addition to the first one or more storage units.

5. The system of claim 1, wherein the one or more computing nodes at least:
determine a capacity of the second storage device based at least in part on an amount of data available from the data source.

6. A non-transitory computer-readable storage medium having stored thereon executable instructions that, upon execution by a computing device, cause the computing device at least to:
receive information indicative of adding data from a data source to a first collection of data stored by a first database engine in a first one or more storage units on a first storage device;
send instructions to configure a second computing node, wherein the second computing node, when configured, communicates with a second storage device and a second database engine is operative thereon;
receive information indicative of a schema of the first collection of data and information indicative of a format of the first one or more storage units;
send instructions to the second database engine to form a second collection of data from the data source, the second collection of data comprising at least a subset of the schema of the first collection of data, the second collection of data stored in a second one or more storage units on the second storage device, the second one or more storage units in the format of the first one or more storage units;
copy the second one or more storage units to the first storage device; and
send instructions to a first computing node to configure the first database engine to add the copied second one or more storage units to the first collection of data.

7. The non-transitory computer-readable storage medium of claim 6, wherein the second database engine is configured to operate in a reduced locking mode.

8. The non-transitory computer-readable storage medium of claim 6, comprising further instructions that, upon execution, cause the computing device to at least:
modify metadata comprising references to storage units of which the first collection is comprised to include one or more references to the second one or more storage units.

9. The non-transitory computer-readable storage medium of claim 6, comprising further instructions that, upon execution, cause the computing device to at least:
determine a capacity of the second storage device based at least in part on a characteristic of the data source.

10. The non-transitory computer-readable storage medium of claim 6, comprising further instructions that, upon execution, cause the computing device to at least:

allocate and configure a computing node for operating the second database engine; and execute a workflow comprising the steps of loading data from the data source into the second collection of data, copying the second one or more storage units, and configuring the first database engine.

11. The non-transitory computer-readable storage medium of claim 6, wherein the second storage device is write-optimized.

12. The non-transitory computer-readable storage medium of claim 6, comprising further instructions that, upon execution, cause the computing device to at least:

deallocate the second computing node in response to the second one or more storage units being copied to the first storage device.

13. A method, comprising:

receiving, at one or more computing nodes, information indicative of adding data from a data source to a first collection of data maintained by a first database engine in a first one or more storage units in a first memory;

configuring an additional computing node that, when configured, communicates with a second memory and a second database engine operating therein;

receiving information indicative of a schema of the first collection of data and information indicative of a format of the first one or more storage units;

configuring, by the additional computing node, the second database engine to maintain data from the data source in a second collection of data in a second one or more storage units in the second memory, the second collection of data comprising a portion of the schema of the first collection of data, the second one or more storage units of a format selected for compatibility with the first one or more storage units;

transmitting the second one or more storage units to the first memory; and configuring the first database engine to maintain the transmitted second one or more storage units with the first collection of data.

14. The method of claim 13, further comprising:

suspending threads of execution of the second database engine that are unassociated with adding data from the data source to the second collection of data.

15. The method of claim 13, further comprising:

modifying metadata comprising references to storage units of which the first collection of data is comprised to include one or more references to the second one or more storage units.

16. The method of claim 13, further comprising:

selecting the second memory to maintain data from the data source, based at least in part on an amount of data available from the data source.

17. The method of claim 13, further comprising:

managing execution of a workflow for loading data from the data source into the second collection of data, copying the second one or more storage units, and configuring the first database engine, by a second computing node of the one or more computing nodes.

18. The method of claim 13, wherein a storage device comprises both the first memory and the second memory.

19. The method of claim 13, further comprising:

selecting the at least a subset of the schema of the first collection of data based at least in part on matching the format of the second one or more storage units and of the first one or more storage units.

20. The method of claim 13, further comprising:

allocating the additional computing node from a pool of virtual computing node instances.

* * * * *